USO10374953B1

United States Patent
Branch et al.

(10) Patent No.: US 10,374,953 B1
(45) Date of Patent: Aug. 6, 2019

(54) METHOD AND APPARATUS FOR TRAFFIC OPTIMIZATION IN VIRTUAL PRIVATE NETWORKS (VPNS)

(71) Applicant: CLOUDFLARE, INC., San Francisco, CA (US)

(72) Inventors: Christopher Philip Branch, Romford (GB); Dane Orion Knecht, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/253,819

(22) Filed: Jan. 22, 2019

(51) Int. Cl.
*H04L 12/741* (2013.01)
*H04L 12/46* (2006.01)
*H04L 29/08* (2006.01)
*H04L 29/06* (2006.01)

(52) U.S. Cl.
CPC ........ *H04L 45/745* (2013.01); *H04L 12/4633* (2013.01); *H04L 12/4641* (2013.01); *H04L 67/10* (2013.01); *H04L 67/28* (2013.01); *H04L 67/42* (2013.01)

(58) Field of Classification Search
CPC ............... H04L 45/745; H04L 12/4633; H04L 12/4641; H04L 67/10; H04L 67/28; H04L 67/42
See application file for complete search history.

(56) References Cited

U.S. PATENT DOCUMENTS

2017/0171156 A1* 6/2017 Schultz ............... H04L 63/0272
2018/0062992 A1* 3/2018 Cohn ...................... H04L 45/74

OTHER PUBLICATIONS

Networks and Tunnel Routing, Cloud VPN, Google Cloud, Nov. 6, 2018, 9 pages, downloaded at https://cloud.google.com/vpn/docs/concepts/choosing-networks-routing on Jan. 22, 2019.
Virtual Private Network, Wikipedia, Jan. 15, 2019, 9 pages, downloaded at https://en.wikipedia.org/wiki/Virtual_private_network on Jan. 22, 2019.

* cited by examiner

*Primary Examiner* — Afshawn M Towfighi
(74) *Attorney, Agent, or Firm* — Nicholson De Vos Webster & Elliott LLP

(57) ABSTRACT

Method and apparatus for traffic optimization in virtual private networks (VPNs). A client device establishes a first VPN connection with a first server based on first VPN credentials. Traffic is transmitted and received through the first VPN connection to and from the first server. A second server is identified based on traffic optimization criteria that need to be satisfied by the VPN connection. Upon receipt of the identification of the second server the client device is to use the second server as a destination of a second VPN connection. The second VPN connection satisfies a set of traffic optimization goals for at least one flow from the flows forwarded through the first VPN connection. Based on the identification of the second server, the client device establishes the second VPN connection for the flow between the client device and the second server.

30 Claims, 6 Drawing Sheets

METHOD AND APPARATUS FOR TRAFFIC OPTIMIZATION IN VIRTUAL PRIVATE NETWORKS (VPNS)

FIELD

Embodiments of the invention relate to the field of network services; and more specifically to traffic optimization in virtual private networks (VPNs).

BACKGROUND

A Virtual Private Network (VPN) is an internet security service that allows users to access the Internet as though they were connected to a private network. A VPN service allows a user to encrypt Internet communications and provide the user with a strong degree of anonymity when browsing the Internet. Users may use a VPN service to protect themselves against eavesdropping that may occur on public Wi-Fi, to circumvent Internet censorship, or to connect to a business's internal network for the purpose of remote work.

Establishing a VPN tunnel between two network nodes involves establishing and maintaining a logical network connection (the logical network connection can be referred to as a VPN connection). The VPN connection between two network nodes may contain intermediate hops. In the VPN connection, packets constructed in a given VPN protocol format are encapsulated within another carrier protocol. The VPN packets are then transmitted between VPN client and server and de-encapsulated on the receiving end.

For Internet-based VPNs, packets in a VPN protocol are encapsulated within Internet Protocol (IP) packets. VPN protocols also support authentication and encryption to keep the tunnels secure. Thus, a VPN is a network tunneled within another network (e.g., within the IP network).

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
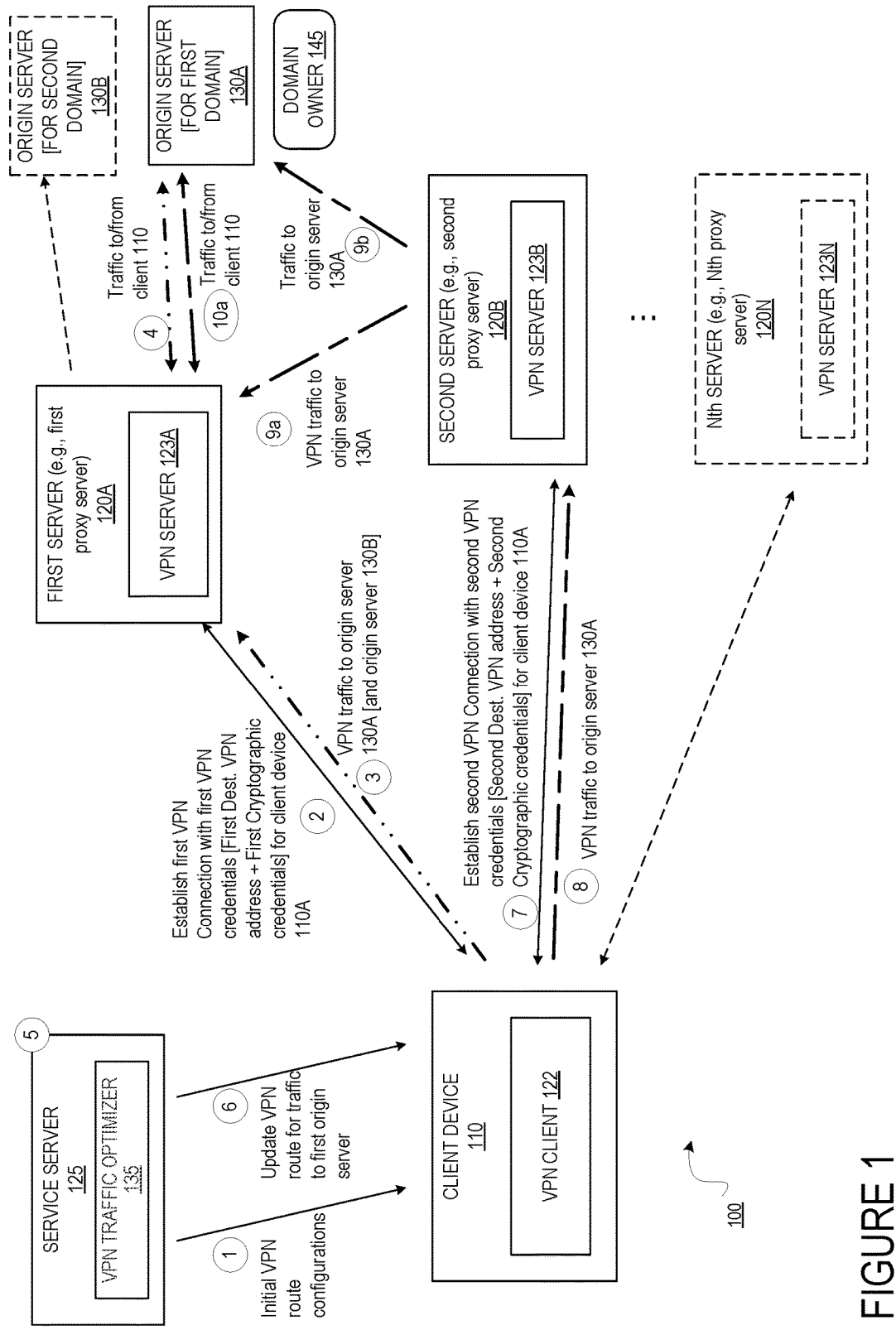
FIG. 1 illustrates a block diagram of an exemplary architecture for enabling traffic optimization in virtual private networks, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In one embodiment, a client device establishes a first VPN connection with a first server based on first VPN credentials. One or more flows of traffic are transmitted and received through the first VPN connection to and from the first server. The service server determines an identification of a second server. The second server is identified based on one more traffic optimization criteria that need to be satisfied by the VPN connection. The service server transmits the identification of the second server to the client device. The client device receives an identification of the second server to be used as a destination of a second VPN connection. The second VPN connection satisfies a set of traffic optimization goals for at least one flow from the flows forwarded through the first VPN connection. Based on the identification of the second server, the client device establishes a second VPN connection for the at least one flow from the flows between the client device and the second server.

FIG. 1 illustrates a block diagram of an exemplary architecture for enabling traffic optimization in virtual private networks, in accordance with some embodiments. The architecture 100 includes a client device 110, two or more servers 120A-N, one or more origin servers 130A-B, a domain owner 145 and a service server 125.

The client device 110 is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources served by a server. The client device 110 includes a VPN client 122 that is associated with a first VPN address. The VPN client 122 is operative to perform operations of a private virtual network protocol. Several VPN protocols can be used without departing from the scope of the present invention. The client device 110 is operative to establish one or more VPN connections with one or more servers. The client device 110 is operative to transmit and receive traffic to and from a server through a VPN connection based on VPN credentials associated with the client device 110. The VPN credentials identify a VPN address of the client device 110 and cryptographic credentials to allow for secure communication through the VPN connection. The client device 110 is operative to transmit a request for a network resource that is served by the origin server 130A. In some embodiments, the client device 110 is operative to transmit the request for the network resource through the VPN connection(s). The VPN connection can be referred to as a VPN tunnel. While a single client device is illustrated, any number of client devices can be in communication with each one of the servers 120A-N.

Each one of the servers 120A-N is a computing device coupled with one or more client devices through a network (not illustrated). Each one of the servers 120A-N includes a respective VPN server 123A-N. Each one of the VPN server 123A-N is operative to perform operations of a private virtual network protocol. Several VPN protocols can be used without departing from the scope of the present invention. Each one of the servers 120A-N is operative to establish one or more VPN connections with one or more client device. Each one of the servers 120A-N is operative to establish a VPN connection with the client device 110. Each one of the servers 120A-N is operative to transmit and receive traffic to and from a client device (e.g., client device 110) through a VPN connection based on VPN credentials. The VPN credentials include a VPN address of the client device as well as cryptographic credentials of the client device. The VPN credentials further include a VPN address associated with the server and cryptographic credentials associated with the server. The cryptographic credentials of the server and the client device allow for secure communication through the VPN connection. The cryptographic credentials can include authentication credentials that allow for authentication of the server and the client device. The cryptographic credentials may further include encryption keys for encrypting traffic within the VPN tunnel between the client device and the server.

Each one of the servers 120A-N enable client devices to access network resources hosted on origin servers (e.g., 130A-B) through a VPN connection. The VPN connections established between the client device 110 and the server 120A enables the client device to obtain anonymity and secure communication when accessing network resources hosted or served by the origin server 130A. Each one of the servers 120A-N is not typically part of the local network of the origin servers 130A-B. For example, the first server 120A is outside of the local area network of the origin server 130A and is typically not physically accessible by the owner/administrator of the origin server 130A.

In some embodiments, each one of the servers 120A-N is a proxy server that is part of a cloud-based proxy service. The cloud-based proxy server provides different services for customers (e.g., the domain owner 145). For example, the first server 120A can be a first proxy server situated between client devices (e.g., client device 110) and the origin servers 130A-B. In one embodiment, each one of the proxy servers 120A-N is a reverse proxy server. Certain network traffic is received and processed through the proxy servers. For example, web traffic (e.g., HTTP requests/responses, HTTPS requests/responses, SPDY requests/responses, etc.) for domains of the origin server 130A may be received and processed at the first server 120A. In one embodiment, the domain owner 145 is a customer of the cloud-based proxy service. The owner of the servers 120A-N is typically different than the owner of the origin servers 130A-B.

By way of example, the cloud-based proxy service may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides a mechanism for establishing VPN connections between client devices and one or more proxy servers of the service when the client devices attempt to access resources served by the origin servers.

Generally speaking, each one of the servers 120A-N receives network traffic from the client device 110 requesting Internet resources. The request for Internet resources is performed through a VPN connection based on the VPN credentials of each one of the client device and the respective server. For example, the first server 120A may receive requests for an action to be performed on an identified resource (e.g., an HTTP GET request, an HTTP POST request, other HTTP request methods, or other requests to be applied to an identified resource on an origin server) from the client device 110 through a first VPN connection. The request received from the client device 110 is destined for an origin server (e.g., origin server 130A).

Each one of the servers 120A-N analyzes incoming traffic and takes one or more actions on the incoming traffic. For example, the servers 120A-N may cause the incoming traffic to be fulfilled. In some embodiments, each one of the servers 120A-N may transmit the outgoing traffic to the appropriate origin server 130A-B. For example, the first server 120A may receive a first request for a network resource through a first VPN connection. The first request for the network resource may be encrypted as per the VPN protocol requirements. The first server 120A is operative to decrypt the traffic received through the VPN protocol and obtain the first request for the network resource. The server 120A is operative to fulfil the request. For example, the server 120A may transmit a request (e.g., an HTTP GET request) for the network resource to the origin server 130A. The origin server 130A may transmit a response (e.g., an HTTP response) with the requested resource to the first server 120A. The first server 120A may analyze the incoming traffic including the response and take one or more actions, including, for example, transmitting the response to the requesting client device 110. The response may be transmitted through the first VPN connection established with the client device 110. In some embodiments, the packets transporting the response are encrypted based on the VPN credentials associated with the first VPN connection. In some embodiments, the first server 120A may also cache resources for the domains and respond to requests from client devices locally if the requested resource is in cache.

In some embodiments, incoming traffic is received at a particular server 120A as a result of a DNS request for a domain of one of the domain owners 145 resolving to an IP address of the server 120A. By way of example, DNS record(s) for the domain "example.com" may resolve to an IP address of a server 120A. In some embodiments, multiple domains that may be owned by different domain owners may resolve to the same server 120A (e.g., the same IP address or a different IP address of the server 120A). For example, the domain owner 145 owns one or more domains (e.g., example.com) for which the first server 120A may receive requests. The first server 120A may receive requests for the resources at a given location of the domain (e.g., example.com/login).

Each one of the origin servers 130A-B is an electronic device that serves network resources (e.g., web pages, images, word processing documents, PDF files movie files, music files, or other computer files). For example, each one of the origin server 130A-B may host one or more domains of domain owners and is operative to respond to requests for resources at that domain. For example, the origin server 130A may host a domain (example.com) owned by domain owner 145. Each one of the origin servers 130A-B may generate the network resources or alternatively may be coupled with another server that generates the network resources. Although not illustrated in FIG. 1 and FIGS. 2A-B, it should be understood that the network resources of the origin servers may be stored separately from the device that responds to the requests.

In some embodiments, the domain owner 145 is a customer of a cloud-based service and registers their respective domain for the service. For example, the authoritative name servers for each domain of the domain owner 145 may be changed to the authoritative name server of the service. It should be understood that the backup authoritative name server serving the domain may also be changed to an authoritative name server of the service. The zone file record for the domain is also changed such that DNS resolution requests for the domain owned by the domain owner 145, which corresponds with the origin server 130A, resolve to the first server 120A. In one embodiment, a customer (e.g., the domain owners 145 or other entity (e.g., web administrators) on behalf of the domain owner 145) may use the service server 125 to change their authoritative name server to the authoritative name server and change their zone file to have their domain point to the first server 120A. In some embodiments, the domain owner 145 or an administrator of the domain may perform these changes through a graphical interface.

The service server 125 is an electronic device operated by the cloud-based proxy service. The service server 125 includes a VPN traffic optimizer 135. The VPN traffic optimizer 135 is operative to analyze the network formed by the different servers 120A-N and determine optimized routes within the network formed by the servers 120A-N for VPN connection between a client device and a server.

In some embodiments, the service server 125 may also provide a set of tools and interfaces for the domain owner 145 that are accessible over the Internet. For example, the service server 125, among other things, allows the domain owner 145 to register for the cloud-based proxy service, view statistics/logs of events, and report suspicious events. The service server 125 includes tools to assist the domain owner 145 in changing their authoritative name servers and zone file record. It should be understood, however, that the domain owner 145 may change their authoritative name server and zone file without use of the service server 125 (i.e., they may directly change the authoritative name server and zone file). The service server 125 includes tools to assist the domain owner 145 to select a set of services offered by the cloud-based proxy service.

The architecture 100 may further include a DNS system that is not illustrated. The DNS system may include multiple DNS servers to resolve DNS requests. The DNS system includes an authoritative name server, which is an authoritative name server for the service. Thus, the authoritative name server is the authoritative name server for the domains corresponding to the origin servers 130A-B. Accordingly, when the DNS system resolves a request for a domain corresponding to the origin server 130A or the origin server 130B, the authoritative name server provides the authoritative answer. It should be understood that the DNS system may include several DNS servers (e.g., preferred domain servers, top-level domain name servers, other domain servers). It should also be understood that there may be multiple authoritative web servers for the service and they may be geographically distributed. When the domain owner 145 is a customer of the cloud-based proxy service, DNS resolution requests for the domain owned by the domain owner 145, which corresponds with the origin server 130A, resolve to an IP address of a proxy server that is part of the service (e.g., the first server 120A). When the domain owner 145 is not a customer of the cloud-based proxy service, or alternatively the servers 120A-N are not part of a cloud-based proxy service, DNS resolution requests for the domain owned by the domain owner 145 resolve to an IP address of the origin server 130A.

In some embodiments the cloud-proxy service has multiple proxy servers that are geographically distributed. For example, in some embodiments, the service uses multiple point of presences (POPs). A POP is a collection of networking equipments (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP. While FIG. 1 illustrates two origin servers 130A-B and a single client device 110 respectively coupled with the first server 120A, in some embodiments each of the servers 120A-N is coupled with multiple origin servers and/or with multiple client devices. Moreover, in some embodiments, there are multiple proxy servers providing service for a particular domain.

In operation, the service server 125 transmits initial VPN route configurations to the client device 110 at operation 1. In some embodiments, the client device 110A establishes, at operation 2, a first VPN connection with the first server 120A based on first VPN credentials. The first VPN credentials include cryptographic credentials associated with the client device 110A and the first server 120A to enable a secure communication through a VPN protocol between the client device 110 and the first server 120A. The first VPN credentials further include a first VPN destination address. When the first VPN connection is established, the first VPN destination address identifies the first server 120A. At operation 3, one or more flows of traffic are transmitted and received through the first VPN connection to and from the first server 120A. In some embodiments, based on the initial VPN route configuration, all traffic originating from the client device 110 is transmitted through the first VPN connection towards the first server 120A, which acts as a VPN server and the VPN destination of the first VPN connection. The first server 120A de-encapsulate the traffic received through the first VPN connection and transmits the traffic to the original destination (e.g., the origin server 130A) at operation 4.

At operation 5, the service server 125 determines an identification of a second server 120B. The second server 120B is identified based on one more traffic optimization criteria that need to be satisfied by the VPN connection. At operation 6, the service server 125 transmits the identification of the second server 120B to the client device 110 to update the VPN route for traffic to the first origin server 130A. The client device 110 receives an identification of the second server 120B to be used as a destination of a second VPN connection. The second VPN connection satisfies a set of traffic optimization goals for at least one flow from the flows forwarded through the first VPN connection.

Based on the identification of the second server 120B, the client device establishes, at operation 7, a second VPN connection for at least one flow from the flows between the client device and the second server based on the second VPN credentials. The second VPN credentials include cryptographic credentials that enable the second server 120B and the client device 110 to communicate securely through the VPN protocol. The VPN credentials further include the VPN address of the client device 110 and the VPN destination address of the second server 120B. Upon establishment of the second VPN connection, the client device 110 forwards, at operation 8, at least one flow through the second VPN connection to the second server 120B. In some embodiments, all traffic that was previously forwarded through the first VPN connection is routed through the second VPN connection. In other embodiments, only a portion of the traffic is routed through the second VPN connection towards the second server 120B while another portion of the traffic continues to be routed through the first VPN connection towards the first server 120A. For example, the first server 120A can be coupled with the two origin servers 130A and 130B and traffic between the client device 110 towards and from each one of these origin servers is forwarded through the first VPN connection in the initial phase. In this example, the second VPN connection can be established for traffic that is destined to a first domain which is served by the first origin server 130A and traffic destined to a second domain served by the second origin server 130B can be forwarded through the first VPN connection.

The two VPN connections can be used successively such that a first connection is first established to forward all traffic destined to one or more origin servers and then the second connection is established to forward all of this same traffic without the first connection being used. Alternatively, the two VPN connections can be used concurrently such that part of the traffic is forwarded through the first VPN connection and another part of the traffic is forwarded through the second VPN connection.

Upon receipt of the traffic from the client device 110, the second server 120A forwards traffic to the origin servers. For example, the second server 120A transmits traffic to the origin server 130A. In some embodiments, the traffic can be forwarded towards the origin server 130A through the first server 120A, operation 9a. A VPN connection can be established between the first server 120A and the second server 120B such that traffic received through the second VPN connection is transmitted via this VPN connection between the servers 120A and 120B. The server 120A then forwards, at operation 10a, the traffic to the origin server 130A. This allows for continuous forwarding of traffic to/from the origin server 130A and the client device 110 without interruption even when the VPN connection originating from the client device 110 was rerouted towards a second server 120B. Alternatively, the traffic can be forwarded towards the origin server 130A without going through the first server 120A, at operation 9b. For example, for new traffic originating from the client device 110 which was not previously routed through the first VPN connection, this traffic is transmitted through the second VPN connection and towards the first origin server 130A (without going through the first server 120A).

Figure 2A:
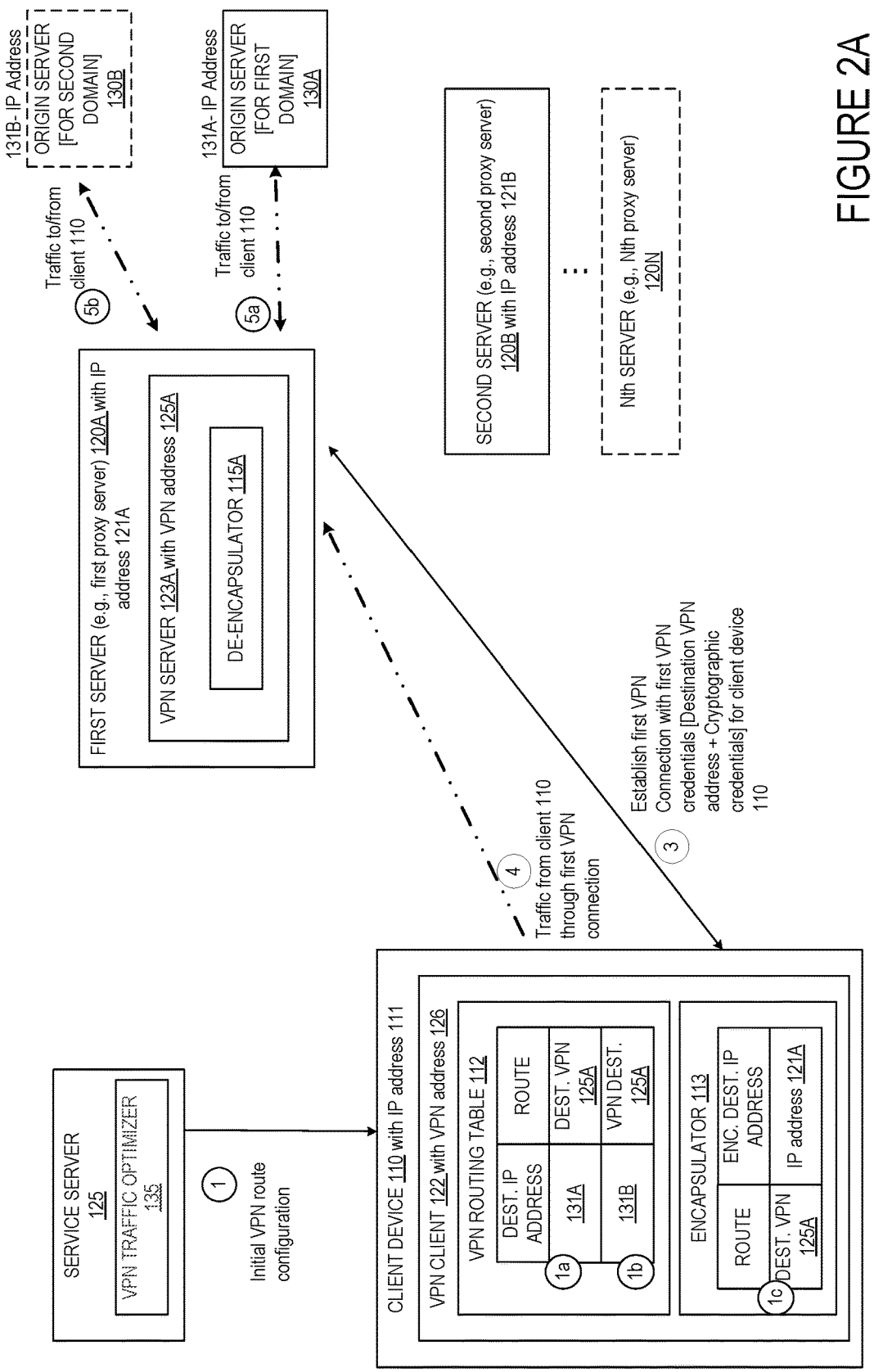
FIG. 2A illustrates a block diagram of detailed operations for initial configuration of the VPN, in accordance with some embodiments.

FIG. 2A illustrates a block diagram of detailed operations for initial configuration of the VPN, in accordance with some embodiments. Each one of the devices (e.g., client device, first server 120A, second server 120B, origin server 130A, and origin server 130B) is a network device that has an associated IP address (e.g., IP address 111, IP address 121A, IP address 121B, IP address 131A, and IP address 131B). The IP addresses of each device (110, 120A-B, 130A-B) allows the device to communicate through the IP protocol with the other devices (110, 120A-B, 130A-B) in the network. The IP address is an Internet-addressable addresses. Each one of the devices (110, 120A-B, 130A-B) may be coupled to another one of the devices (110, 120A-B, 130A-B) via one or more network devices that are not illustrated. Further, to enable the VPN communication the client device 110 includes a VPN routing table 112. The VPN routing table includes VPN entries that define VPN routes in the network. Each VPN route has a destination IP address and a corresponding VPN destination address (VPN Dest. Add.). The client device 110 further includes an encapsulator 113 that includes for each VPN route a respective IP encapsulation destination address. The IP encapsulation destination address identifies the IP address that is to be used as a destination for encapsulating the VPN traffic addressed to a particular VPN destination address.

In an initial set up the client device 110 is configured to include a first entry (1a) and a second entry (1b) in the VPN routing table 112 and for VPN destination 125A an associated encapsulation IP address 121A. In this initial set up the routing table 112 includes a first entry 1a such that traffic destined to IP address 131A of the origin server 130A is routed through a VPN route with VPN destination 125A. The routing table 112 further includes a second entry 1b such that traffic destined to IP address 131B of the origin server 130B is also routed through the same VPN route with VPN destination 125A. The client device 110 is configured such that a first VPN connection can be established between the client device 110 with a source VPN address 126 (VPN Src. Add.) and the first VPN destination address 125A. According to 1c, the first VPN destination address 125A is associated with the first destination IP address 121A of the first server 120A. Thus, when the client device 110A establishes, at operation 3, a first VPN connection with the first server 120A that is done based on the entry (1c) with the VPN destination address 125A and the IP address 121A of the first server 120A. The traffic transmitted through the VPN connection is encapsulated within IP packets with destination IP address 131A or 131B. The first VPN connection is established based on the cryptographic credentials associated with the first client device 110 and the first VPN server 120A. The cryptographic credentials associated with the client device 110A and the first server 120A enable a secure communication through a VPN protocol between the client device 110 and the first server 120A. In some embodiments, the cryptographic credentials include cryptographic keys of the client device 110 and the first server 120A that are exchanged during the establishment of the first VPN connection.

In some embodiments, the first VPN connection is established for forwarding a set one or more flows. A flow may include IP packets of a request for network resources at a first domain. The packets received at the client device 110 through the first VPN connection may include the requested network resources. The first domain is served by the origin server 130A. In some embodiments, traffic including requests and responses of more than one domain can be forwarded through the first VPN connection. For example, the client device can transmit requests for network resources at two or more domains. The domains can be served by different origin servers (e.g., first domain served by origin server 130A and second domain served by origin server 130B). Alternatively, the domains can be served by the same origin server.

In some embodiments, the origin server 130A is a customer of a cloud-based proxy server and a DNS request for the domain served by the origin server 130A resolves to an IP address of the proxy server 120A instead of an IP address of the origin server 130A. In these embodiments, the routing table 112 may include, instead of the IP address 131A of the origin server 130A, an IP address 121A of the proxy server 120A as the destination IP address. In these embodiments, the destination IP address is associated with a VPN route (with destination VPN 125A). The destination VPN address 125A is then associated with an encapsulation destination IP address 121A, which is the IP address of the first server 120A. The requests for and the responses of the network resources are transmitted to the origin servers through the proxy server and the VPN connection is established between the client device (e.g., client device 110) and the proxy server (e.g., first server 120A) that is coupled with the origin server serving the network resources. Thus, in these embodiments, the first server 120A acts as a VPN server as well as a proxy server of the cloud-based proxy service. In these embodiments, when the VPN traffic is received at the first server 120A, a higher-level protocol (e.g., HTTP, HTTPS) can be used to identify the destination of the packets. For example, packets received at the first server 120A through the VPN connection are processed at the first server 120A to determine an HTTP request for network resources at a first domain served by the origin server 130A. The request can be fulfilled by the first server 120A by either transmitting the request to the origin server 130A (e.g., processing the request and transmitting IP packets including the request towards the origin server 130A) or by retrieving network resources previously stored in a cache for that domain.

Figure 2B:
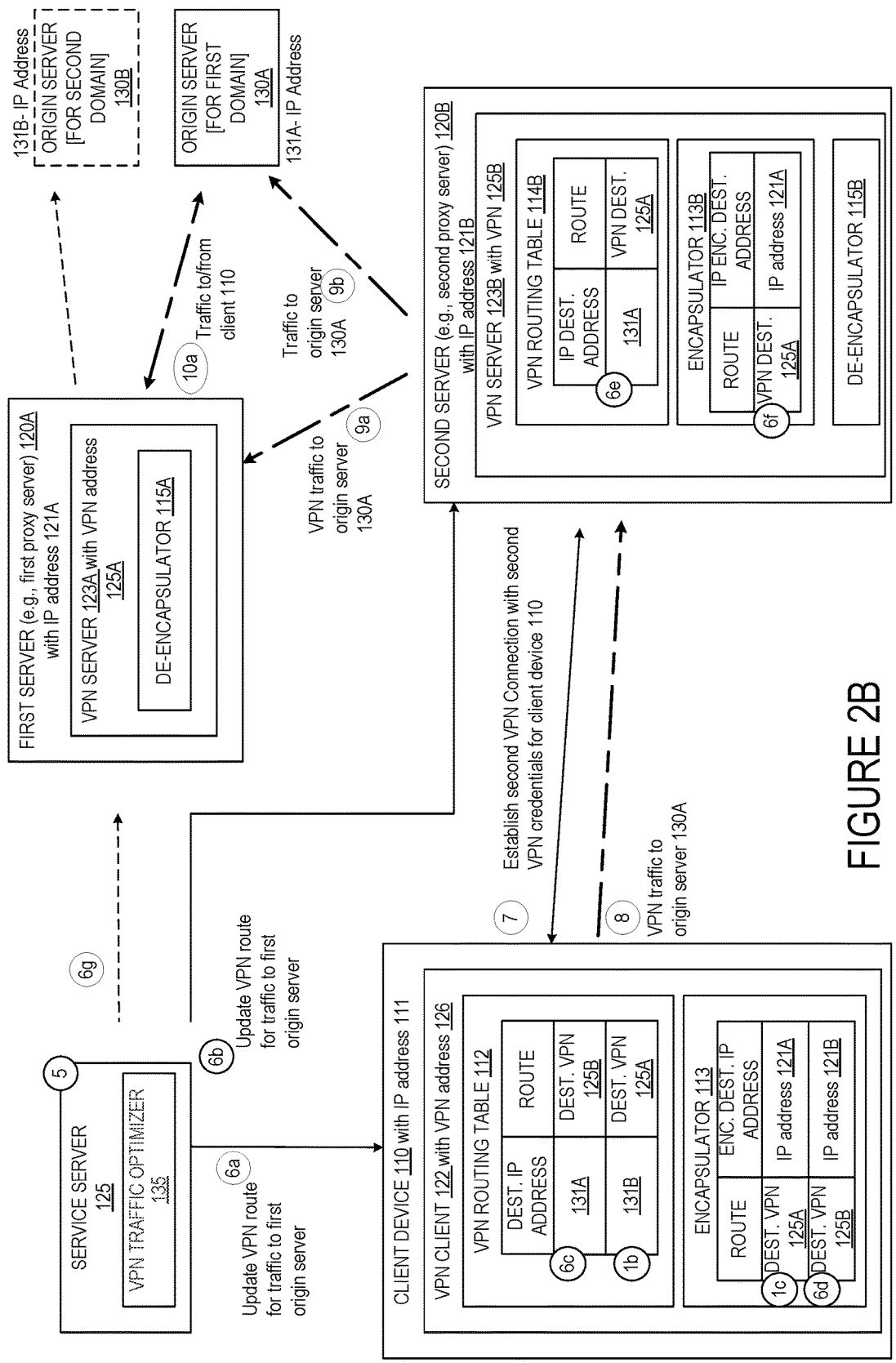
FIG. 2B illustrates a block diagram of detailed operations for configuration of the VPN to optimize traffic in the VPN, in accordance with some embodiments.

FIG. 2B illustrates a block diagram of detailed operations for configuration of the VPN to optimize traffic in the VPN, in accordance with some embodiments. At operation 5, the service server 125 determines an identification of a second server 120B. The VPN traffic optimizer 135 determines a second server 120B from a set of servers that is to be used as a destination of a second VPN connection for the client device 110 to obtain network resources of one or more domains. The second server 120B is identified based on one more traffic optimization criteria that need to be satisfied by a VPN connection between the client device and a VPN server. The VPN traffic optimizer 135 collects network intelligence metrics from requests that are fulfilled by different servers. In some embodiments, when the servers are proxy servers of a cloud-based proxy service 120A-N, the network intelligence metrics relates to requests fulfilled by the proxy servers on behalf of the origin servers.

The VPN traffic optimizer 135 determines based on the collected network intelligence metrics an optimized route for a VPN connection originating from the client device 110. The optimized route identifies a new server that is to be used as a destination of the VPN connection instead of the first server 120A, where the optimized route satisfies the traffic optimization criteria. The collected metrics can be obtained based on active or passive monitoring of remote destinations (e.g., proxy servers, and/or origin servers) to measure latency, packet loss, congestion or other network metrics. In some embodiments, the determination of the server is further performed based on properties of the network such as cost, reliability, current or predicted utilization. The determination of the optimized route can be performed to satisfy one or multiple optimization criteria, including ensuring low latency responses between the client device and the origin server hosting the requested network resource, high reliability of the traffic between the client device and the origin server and/or the proxy server, low cost of the VPN connection established for the client device, and/or quality of the VPN service.

In some embodiments, the traffic optimization criteria can be determined based on the characteristics of the VPN protocol that is used to establish the VPN connections. For example, the optimization criteria can be set based on characteristics of the protocol such as whether a protocol is latency-sensitive or insensitive, has high or low bandwidth requirements, or how tolerant the specific protocol is to packet loss. The optimized route is determined based at least in part on the characteristics of the protocol.

In some embodiments, the traffic optimization is performed for traffic of a given domain such that the second server is to be used as a destination of a second VPN connection that is to be used to forward traffic of the given domain. In other embodiments, the traffic optimization is performed for traffic of multiple domains (e.g., a subset of all domains of network resources that are requested at the client device 110, or all domains of network resources requested at the client device 110) and the second VPN connection is to be used for forwarding traffic of the multiple domains.

At operation 6a, the service server 125 transmits an update to the VPN routes to the client device 110. For example, the service server 125 transmits the identification of the second server 120B to the client device 110. The client device 110 receives an identification of the second server 120B to be used as a destination of the second VPN connection. The identification of the second server 120B includes an IP address of the second server 120B. The request to update the VPN route at 6a may further indicate which flows are to be forwarded through the new VPN route. The service server 125 may identify a flow based on its destination IP address and/or source IP address, based on a domain name, or other types of flow identification. For example, the service server 125 may transmit the source IP address of the client device with the new VPN route identification to indicate that all flows originating from the client device are to be transmitted through the new VPN connection. Alternatively, the service server 125 may transmit a set of one or more destination IP addresses with the identification of the new VPN route indicating that all flows destined to these destinations are to be routed through the new VPN route. In another example, the service server 125 may transmit a domain name (e.g., first domain) that is served by the origin server 130A. The flows identified may be flows that were previously transmitted/received by the client device or alternatively new flows that are to be transmitted/received by the client device.

The second VPN connection satisfies a set of traffic optimization goals for at least one flow from the flows forwarded through the first VPN connection. The VPN traffic optimizer 135 causes configuration of the client device's VPN routing table 112 to route traffic to certain destinations via the selected second server that is determined by the VPN traffic optimizer 135. For example, at operation 6a, the routing table 112 is updated to include entry 6c such that traffic destined to IP address 131A of the origin server 130A is routed through a VPN route with VPN destination 125B. The routing table 112 further includes a second entry 1b such that traffic destined to IP address 131B of the origin server 130B is routed through another VPN route with VPN destination 125A. The entry 1b is not updated as no indication is received from the service server 125 to update the VPN route for this traffic. The traffic optimizer 135 identifies (in 6d) the IP address 121B of second server 123B as the encapsulation destination IP address for the VPN destination address 125B.

In the embodiments where the origin server 130A is a customer of a cloud-based proxy server, the routing table 112 is updated to include a VPN route (VPN destination 125B) for the IP address of the proxy server 120A as the destination IP address (instead of the IP address of the origin server 131A as illustrated in FIG. 2B). The destination VPN address 125B is then associated with an encapsulation destination IP address 121B, which is the IP address of the second server 120B. In these embodiments, while the second server 120B is updated to be the VPN server (destination of the second VPN connection) for the flows, the first server 120A may remain the proxy server of the cloud-based service that is the actual destination of the flows as opposed to the origin server 130A.

While the illustrated example shows that only one entry in the VPN routing table is updated, in other examples, multiple flows or all flows that are tunneled through the first VPN connection are updated to be routed through the second VPN connection. In these alternative examples, multiple or all entries of the routing table 112 are updated with the VPN destination address 125B instead of VPN destination address 125A. In some embodiments, the VPN routing table 112 may also be configured on a per-protocol level, either by routing based on both port and VPN IP address, by packet inspection, or any other mechanism available to VPN client 122 to detect and determine a protocol.

Based on the identification of the second server 120B, the client device establishes a second VPN connection for at least one flow from the flows between the client device and the second server based on second VPN credentials. The second VPN credentials include cryptographic credentials that enable the second server 120B and the client device 110 to communicate securely through the VPN protocol. The second VPN credentials further include the VPN source address of the client device 110 and the second VPN destination address of the second server 120B. Upon establishment of the second VPN connection, the client device 110 forwards at least one flow through the second VPN connection to the second server 120B. In some embodiments, all traffic that was previously forwarded through the first VPN connection is routed through the second VPN connection. In other embodiments, only a portion of the traffic is routed through the second server 120B. For example, the first server 120A can be coupled with the two origin servers 130A and 130B and traffic between the client device 110 towards and from each one of these origin servers is forwarded through the first VPN connection. In this example, the second VPN connection can be established for traffic that is destined to a first domain which is served by the first origin server 130A while traffic destined to a second domain served by the second origin server 130B continues to be forwarded through the first VPN connection.

These two VPN connections can be used successively such that a first connection is first established to forward all traffic destined to one or more origin servers and then the second connection is established to forward all of the traffic without the first connection being used. Alternatively, the two VPN connections can be used concurrently such that some traffic is routed through the first VPN connection and other traffic is routed through the second VPN connection.

The VPN traffic optimizer 135 is further operative to configure the second server 120B, at operation 6b. At operation 6b, the VPN traffic optimizer 135 transmits an identification of the first server 120A to be used as a destination VPN address to be used for forwarding traffic destined to the origin server 130A. The traffic optimizer 135 causes the VPN routing table 114B to be updated to include an entry 6e. The entry 6e includes the destination IP address 131A of the origin server 130A and a route for the traffic destined to the IP address 131A. In one embodiment, the route is a VPN route towards VPN address 125A. The entry 6e is used for forwarding traffic that is received from the source VPN address 126 (VPN address of the client device) that is destined to the origin server 131A towards the first server 120A via a third VPN connection. While this embodiment describes a VPN connection between the first server 121A and the second server 121B, in other embodiments, the connection between these servers is not a VPN connection. In some embodiments, the operation 6b may be performed to forward traffic towards the first server 120A when the first server 120A is a proxy server from the cloud-based service that is to receive traffic on behalf of an origin server 130A. In other embodiments, the second server 121B is updated such that it is identified as the proxy server that is to receive traffic on behalf of the first origin server 130A instead of the first server 120A. This may be done by updating DNS records (not shown) such that a DNS request for the first domain resolves to an IP address of the second server 120B instead of the IP address of the first server 120A or the IP address of the origin server 130A.

In some embodiments, the VPN traffic optimizer 135 is further operative to configure the first server 120A, at operation 6g. In some embodiments, the VPN traffic optimizer 135 may perform operation 6g, while in other embodiments, this operation can be skipped as the server 121A is already configured to forward traffic towards the origin server 130A. At operation 6g, the VPN traffic optimizer 135 configures the first server 120A to forward traffic received from the second server 120B and destined to the first origin server 130A towards the origin server 130A. For example, when the connection between the first server 120A and the second server 120B is a VPN connection, the traffic optimizer 135 causes the VPN traffic received through the third VPN connection to be de-encapsulated and forwarded towards the origin server 131A.

In one embodiment, the flows received from the client device 110 through the second VPN connection are transmitted from the second server 120B to the first server 120A, at operation 9a. Once received at the first server 120A, the flows are forwarded towards the first origin server (operation 10a). Alternatively, the flows can be forwarded directly towards the origin server 130A without going through the first server 120A. For example, this may occur when the traffic is new traffic which was not previously forwarded through the first VPN connection. This may also occur, when the second server 120B is identified as a proxy server of the cloud-based service that is to receive traffic on behalf of the origin server 130A.

In the embodiments where the first server 120A remains the proxy server and the second server 120A acts as the VPN server, the requests for and the responses of the network resources are transmitted to the origin servers through the proxy server 120A and via the second VPN connection (7). In these embodiments a third connection (e.g., VPN connection) is established between the second server 120B and the first server 120A. In these embodiments, when the VPN traffic is received at the second server 120B it is de-encapsulated and forwarded towards the first server 120A (through the third VPN connection or other connection). When the traffic is received at the first server 121A, a higher-level protocol (e.g., HTTP, HTTPS) can be used to identify the destination of the packets. For example, an HTTP request for network resources at a first domain served by the origin server 130A can be determined from the packets received. The request can be fulfilled by the first server 120A by either transmitting the request to the origin server 130A or by retrieving network resources from a cache.

In the embodiments where the second server 120B is updated to act as the proxy server instead of the first server 120A, when the VPN traffic is received at the second server 120B it is de-encapsulated and a higher-level protocol (e.g., HTTP, HTTPS) can be used to identify the destination of the packets. For example, an HTTP request for network resources at a first domain served by the origin server 130A can be determined from the received packets. The request can be fulfilled by the second server 120B by either transmitting the request to the origin server 130A or by retrieving network resources from a cache.

The configuration of each one of the client device 110 and the second server 120B can be performed by the service server 125 transmitting the route information via a direct communication link (e.g., through an IP protocol, or other communication protocols that can be used for configuration of the network devices) or alternatively through messages tunneled through the first VPN connection.

The embodiments of the present invention enable the dynamic routing of VPN traffic from a client device towards one or more servers through one or more VPN connections. The multiple VPN connections can be established simultaneously or successively to transmit a portion of all of traffic that is originating from the client device. In some embodiments, the VPN connections are established between the client device and one or more proxy servers of a cloud-based proxy service when the client device is requesting network resources served by origin servers that are coupled with the proxy servers. The routing is dynamically updated to optimize the VPN route that are established based one or more optimization criteria.

The operations in the flow diagrams below will be described with reference to the exemplary embodiments of the FIGS. 1-2B. However, it should be understood that the operations of the flow diagrams can be performed by embodiments of the invention other than those discussed with reference to the other figures, and the embodiments of the invention discussed with reference to FIGS. 1-2B can perform operations different than those discussed with reference to the flow diagrams.

Figure 3:
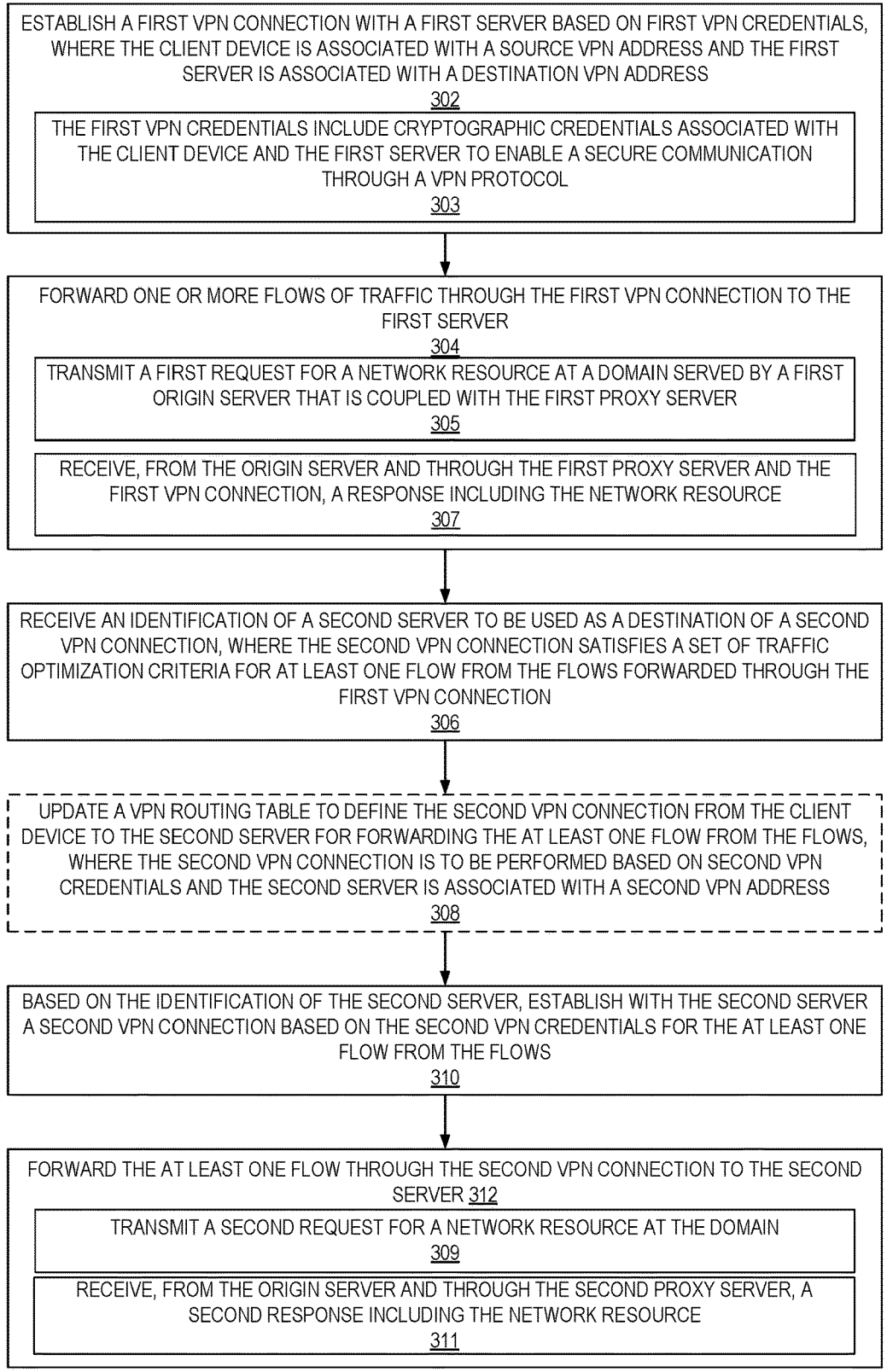
FIG. 3 illustrates a flow diagram of exemplary operations for traffic optimization in virtual private networks, in accordance with some embodiments.

FIG. 3 illustrates a flow diagram of exemplary operations for traffic optimization in virtual private networks, in accordance with some embodiments. At operation 302, the client device 110A establishes a first VPN connection with the first server 120A based on first VPN credentials. The client device is associated with a source VPN address and the first server is associated with a destination VPN address. The first VPN credentials include cryptographic credentials associated with the client device 110A and the first server 120A to enable a secure communication through a VPN protocol between the client device 110 and the first server 120A. The first VPN credentials may further include the first VPN destination address. When the first VPN connection is established, the first VPN destination address identifies the first server 120A as the destination of the first VPN connection. The first VPN destination can be associated with a first encapsulation IP address for encapsulating the VPN traffic. The first encapsulation IP address can be the IP address of the first server 120A or alternatively the IP address of the origin server 130A. The IP address of the first server 120A can be used as the first encapsulation IP address when the first server 120A is a proxy server of a cloud-based proxy service and DNS requests for a domain at the origin server resolve to the IP address of the proxy server instead of the origin server.

At operation 304, one or more flows of traffic are forwarded (transmitted and received) through the first VPN connection to and from the first server 120A. In some embodiments, the first VPN connection is established for forwarding a set one or more flows. A flow may include packets of requests for network resources at a first domain or packets of responses including the network resources at the first domain. The first domain is served by the origin server 130A. In some embodiments, traffic including requests and responses of more than one domain can be forwarded through the first VPN connection. For example, the client device can transmit requests for network resources at two or more domains. The domains can be served by different origin servers (e.g., first domain served by origin server 130A and second domain served by origin server 130B). Alternatively, the domains can be served by the same origin server. In some embodiments, the requests for and the responses of the network resources are transmitted to the origin servers through a proxy server and the VPN connection is established between the client device (e.g., client device 110) and the proxy server (e.g., first server 120A) that is coupled with the origin server serving the network resources. In some embodiments, wherein forwarding the one or more flows of traffic through the first VPN connection includes operations 305 and 307. At operations 305, a first request for a network resource at a domain served by a first origin server that is coupled with the first proxy server, is transmitted. At operation 307, a response including the network resource is received from the origin server and through the first proxy server and the first VPN connection.

The client device 110 receives, at operation 306, an identification of the second server 120B to be used as a destination of a second VPN connection. The identification of a second server 120B is received from a service server (e.g., service server 125). The second server 120B is identified based on one more traffic optimization criteria that need to be satisfied by the VPN connection.

In some embodiments, the traffic optimization criteria include at least one of obtaining low latency for requests for the at least one flow, obtaining high reliability of traffic forwarded through the second VPN connection, ensuring a low cost of the second VPN connection, and ensuring a good quality of service for the second VPN connection. In some embodiments, the traffic optimization criteria can be determined based on the characteristics of the protocol of the packets/traffic sent through the VPN connections. For example, the optimization criteria can be set based on characteristics of the protocol such as whether a protocol is latency-sensitive or insensitive, has high or low bandwidth requirements, or how tolerant the specific protocol is to packet loss. The optimized route based at least in part on the characteristics of the protocol.

The VPN traffic optimizer 135 causes configuration of the client device's VPN routing table 112 to route traffic to certain destinations via the selected second server that is determined by the VPN traffic optimizer 135. At operation 308, the VPN routing table 112 is updated to define the second VPN connection from the client device 110 to the second server 120B for forwarding the at least one flow from the flows. The second VPN connection is to be performed based on second VPN credentials and the second server is associated with a second VPN address.

For example, the service server 125 transmits an update of the VPN routes to the client device 110. The client device 110 receives an identification of the second server 120B to be used as a destination of the second VPN connection. The identification of the second server 120B includes an IP address of the second server 120B. The update the VPN route may further indicate which flows are to be forwarded through the new VPN route. The service server 125 may identify a flow based on its destination IP address and/or source IP address, based on a domain name, or other types of flow identification. For example, the service server 125 may transmit the source IP address of the client device 110 with the new VPN route identification to indicate that all flows originating from the client device 100 are to be transmitted through the new VPN connection. Alternatively, client device 110 may receive a set of one or more destination IP addresses with the identification of the new VPN route indicating that all flows destined to these destinations are to be routed through the new VPN route. In another example, the client device 110 may receive one or more domain names (e.g., first domain) that are served by origin servers (e.g., origin server 130A). The flows identified may be flows that were previously transmitted/received by the client device 110 or alternatively new flows that are to be transmitted/received by the client device 110.

The VPN traffic optimizer 135 causes configuration of the client device's VPN routing table 112 to route traffic to certain destinations via the selected second server. For example, the routing table 112 of the client device 110 is updated to include an entry (e.g., entry 6c) such that traffic destined to IP address 131A of the origin server 130A hosting a first domain is routed through a VPN route with a second VPN destination (e.g., VPN destination 125B). The traffic optimizer 135 identifies the IP address 121B of second server 123B as the encapsulation destination IP address for the VPN destination address 125B and the client device is updated to include the encapsulation destination IP address 121B for the second VPN destination.

In the embodiments where the origin server 130A is a customer of a cloud-based proxy server, the routing table 112 of the client device 110 is updated to include a VPN route (VPN destination 125B) for the IP address of the proxy server 120A as the destination IP address (instead of the IP address of the origin server 131A as illustrated in FIG. 2B). The destination VPN address 125B is then associated with an encapsulation destination IP address 121B, which is the IP address of the second server 120B. In these embodiments, while the second server 120B is updated to be the VPN server (destination of the second VPN connection) for the flows, the first server 120A may remain the proxy server of the cloud-based service that is the actual destination of the flows as opposed to the origin server 130A.

While the illustrated example of FIG. 2B shows that only one entry in the VPN routing table is updated, in other examples, multiple flows or all flows that are tunneled through the first VPN connection are updated to be routed through the second VPN connection. In these alternative examples, multiple or all entries of the routing table 112 are updated with the VPN destination address 125B instead of VPN destination address 125A. In some embodiments, the VPN routing table 112 may also be configured on a per-protocol level, either by routing based on both port and VPN IP address, by packet inspection, or any other mechanism available to VPN client 122 to detect and determine a protocol.

In some embodiments, when not all traffic from the client device 110 is to be routed through the second VPN connection, one or more additional entries can be present in the VPN routing table 112 for one or more flows. These additional entries can for example define the first VPN connection as a tunnel for forwarding traffic and potentially additional VPN connections to one or more other flows of traffic (not illustrated).

Based on the identification of the second server 120B, the client device establishes, at operation 310, a second VPN connection for the at least one flow from the flows between the client device and the second server based on the second VPN credentials. The second VPN credentials include cryptographic credentials that enable the second server 120B and the client device 110 to communicate securely through the VPN protocol. The VPN credentials further include the VPN source address of the client device 110 and the VPN destination address.

Upon establishment of the second VPN connection, the client device 110 forwards, at operation 312, at least one flow through the second VPN connection to the second server 120B. In some embodiments, all traffic that was previously forwarded through the first VPN connection is routed through the second VPN connection. In other embodiments, only a portion of the traffic is routed through the second server 120B. For example, the first server 120A can be coupled with the two origin servers 130A and 130B and traffic between the client device 110 towards and from each one of these origin servers is first forwarded through the first VPN connection. The second VPN connection can be established for traffic that is destined to a first domain which is served by the first origin server 130A and traffic destined to a second domain served by the second origin server 130B can be forwarded through the first VPN connection. Alternatively, the second VPN connection can be established for traffic that is destined to the first domain and for traffic that is destined to the second domain.

In some embodiments, forwarding the at least one flow through the second VPN connection to the second server based on the first VPN credentials associated with the VPN client includes operations 309 and 311. At operation 309, a second request for the network resource at the domain is transmitted. At operation 311, a second response including the network resource is received from the origin server and the second proxy server. In some embodiments, when the first server is a proxy server of the cloud-based proxy service that is operative to receive traffic on behalf of the origin server, the second response including the network resource can be received via the first server and the second server.

Figure 4:
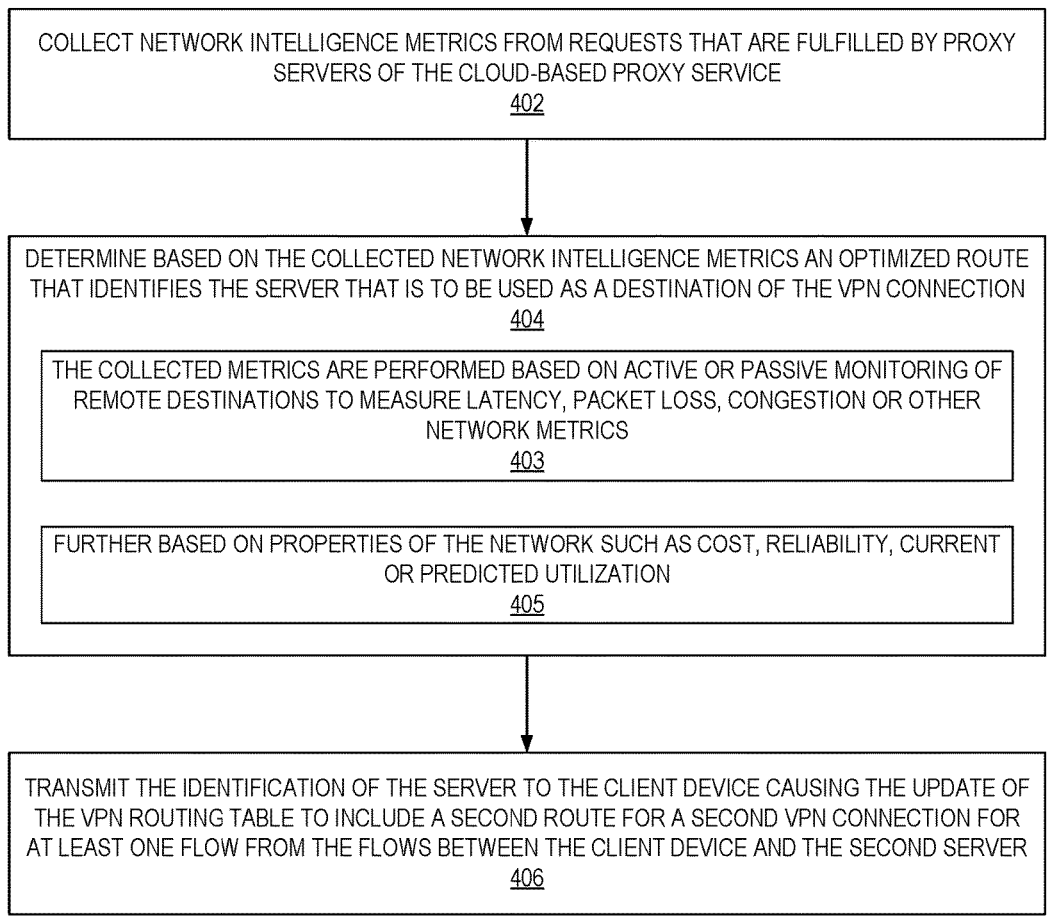
FIG. 4 illustrates a flow diagram of exemplary operations for determining a second server to be used as a VPN destination, in accordance with some embodiments.

FIG. 4 illustrates a flow diagram of exemplary operations for determining a second server to be used as a VPN destination, in accordance with some embodiments. The operations of FIG. 4 are typically performed by a service server 125. The VPN traffic optimizer 135 determines a second server 120B from a set of servers that is to be used as a destination of the VPN connection for the client device 110 to obtain network resources of one or more domain. The second server 120B is identified based on one more traffic optimization criteria that need to be satisfied by the VPN connection.

At operation 402, the VPN traffic optimizer 135 collects network intelligence metrics from requests that are fulfilled by multiple servers that from a set of servers that can be used as VPN servers. For example, the set of servers can be proxy servers of a cloud-based proxy service. At operation 404, the VPN traffic optimizer 135 determines based on the collected network intelligence metrics an optimized route for the VPN connection that identifies the server that is to be used as a destination of the VPN connection. The optimized route satisfies the traffic optimization criteria. The collected metrics can be performed based on (operation 403) active or passive monitoring of remote destinations (e.g., proxy servers, and/or origin servers) to measure latency, packet loss, congestion or other network metrics. In some embodiments, the determination of the server is (operation 405) further performed based on properties of the network such as cost, reliability, current or predicted utilization. The determination of the optimized route can be performed to satisfy one or multiple optimization criteria, including ensuring low latency responses between the client device and the origin server hosting the requested network resource, high reliability of the traffic between the client device and the origin server and/or the proxy server, low cost of the VPN connection established for the client device, and/or quality of service.

In some embodiments, the traffic optimization criteria can be determined based on the characteristics of the protocol of the packets/traffic sent through the VPN connections. For example, the optimization criteria can be set based on characteristics of the protocol such as whether a protocol is latency-sensitive or insensitive, has high or low bandwidth requirements, or how tolerant the specific protocol is to packet loss. The optimized route is based at least in part on the characteristics of the protocol.

In some embodiments, the traffic optimization is performed for traffic of a given domain such that the second server is to be used as a destination of a second VPN connection that is to be used to forward traffic of the given domain. In other embodiments, the traffic optimization is performed for traffic of multiple domains (e.g., a subset of all domains of network resources that are requested at the client device 110, or all domains of network resources requested at the client device 110) and the second VPN connection is to be used for forwarding traffic of the multiple domains.

The service server 125 transmits, at operation 406, the identification of the second server 120B to the client device 110 causing the update of the VPN routing table to include a second route for a second VPN connection for at least one flow from the flows between the client device and the second server based on the first VPN credentials. The client device 110 receives an identification of the second server 120B to be used as a destination of the second VPN connection. The second VPN connection satisfies a set of traffic optimization goals for at least one flow from the flows forwarded through the first VPN connection. The VPN traffic optimizer 135 causes configuration of the client device's VPN routing table 112 to route traffic to certain destinations via the selected second server. For example, at operation 3a, the traffic optimizer 135 identifies the IP address 121B of second server 123A and VPN destination address 125A. The traffic to a given destination is identified based on a flow identifier. The flow identifier can be a destination IP address, a source address, or a domain name. In some embodiments, all flows that are tunneled through the first VPN connection are updated to be routed through the second VPN connection and there is no need to specify the flow for which the second server is intended to be used as a VPN destination.

The embodiments of the present invention enable the dynamic routing of VPN traffic from a client device towards one or more servers through one or more VPN connections. The multiple VPN connections can be established simultaneously or successively to transmit a portion of all of traffic that is originating from the client device. In some embodiments, the VPN connections are established between the client device and one or more proxy servers of a cloud-based proxy service when the client device is requesting network resources served by origin servers that are coupled with the proxy servers. The routing is dynamically updated to optimize the VPN route that are established based one or more optimization criteria.

Figure 5:
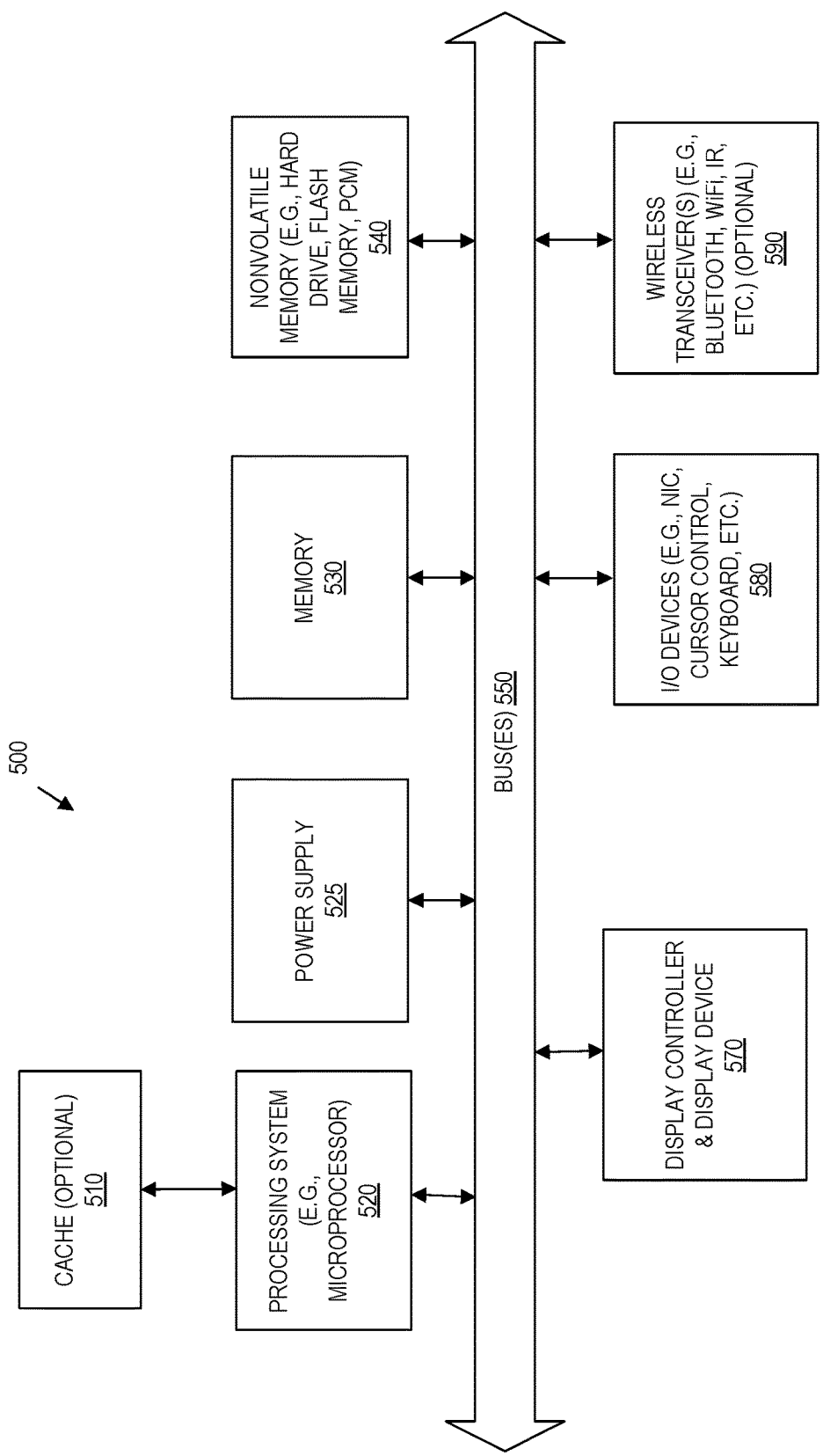
FIG. 5 illustrates a block diagram of an exemplary computer system that can be used for dynamically optimizing a script library in accordance with some embodiments.

FIG. 5 illustrates a block diagram of an exemplary computer system that can be used for traffic optimization in virtual private networks (VPNs), in accordance with some embodiments. The computer system 500, which is an electronic device, includes the bus(es) 550 which is coupled with the processing system 520, power supply 525, memory 530, and the nonvolatile memory 540 (e.g., a hard drive, flash memory, Phase-Change Memory (PCM), etc.). The bus(es) 550 may be connected to each other through various bridges, controllers, and/or adapters as is well known in the art. The processing system 520 may retrieve instruction(s) from the memory 530 and/or the nonvolatile memory 540 and execute the instructions to perform operations described herein. The bus 650 interconnects the above components together and also interconnects those components to the display controller & display device 570, Input/Output devices 580 (e.g., NIC (Network Interface Card), a cursor control (e.g., mouse, touchscreen, touchpad, etc.), a keyboard, etc.), and the optional wireless transceiver(s) 590 (e.g., Bluetooth, Wi-Fi, Infrared, etc.). In one embodiment, the client device 110, the first server 120A, the second server 120B, the service server 125, and/or the origin servers 130A-B can take the form of the computer system 500 and perform the operations described with reference to FIGS. 1-4.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, in a client device, of traffic optimization in a virtual private network (VPN), the method comprising:
   establishing a first VPN connection between with a first server based on first VPN credentials, wherein the client device is associated with a source VPN address and the first server is associated with a destination VPN address;
   forwarding one or more flows of traffic through the first VPN connection to the first server;
   receiving an identification of a second server to be used as a destination of a second VPN connection, wherein the second VPN connection satisfies a set of traffic optimization criteria for at least one flow from the flows forwarded through the first VPN connection;
   based on the identification of the second server, establishing with the second server a second VPN connection based on second VPN credentials for the at least one flow from the flows; and
   forwarding the at least one flow through the second VPN connection to the second server.

2. The method of claim 1 further comprising:
   updating a VPN routing table to define the second VPN connection from the client device to the second server for forwarding the at least one flow from the flows, wherein the second VPN connection is to be performed based on second VPN credentials and the second server is associated with a second VPN address.

3. The method of claim 2, wherein transmitting the one or more flows of traffic through the first VPN connection is performed based on one or more entries in the VPN routing table, wherein each entry from the one or more entries is respectively associated with the one or more flows and each entry identifies for the one or more flows a respective VPN destination address and the respective VPN address is associated with an Internet Protocol (IP) address of the first server as an encapsulation IP address.

4. The method of claim 3, wherein updating the VPN routing table to define the second VPN connection from the client device to the second server includes:
   updating each entry in the VPN routing table associated with one of the at least one flow with a second VPN address of the second server, wherein the second VPN address is associated with an IP address of the second server as an encapsulation IP address.

5. The method of claim 1, wherein the first server is a first proxy server and the second server is a second proxy server and the first and second proxy server are part of a cloud-based proxy service.

6. The method of claim 5, wherein forwarding the one or more flows of traffic through the first VPN connection includes:
   transmitting a first request for a network resource at a domain served by a first origin server that is coupled with the first proxy server; and
   receiving, from the origin server and through the first proxy server and the first VPN connection, a response including the network resource.

7. The method of claim 6, wherein forwarding the at least one flow through the second VPN connection to the second server includes:
   transmitting, a second request for the network resource at the domain; and
   receiving, from the origin server and through the first proxy server and the second proxy server, a second response including the network resource.

8. The method of claim 1, wherein the traffic optimization criteria include at least one of obtaining low latency for requests for the at least one flow, obtaining high reliability of traffic forwarded through the second VPN connection, ensuring a low cost of the second VPN connection, and ensuring a good quality of service for the second VPN connection.

9. The method of claim 1, wherein the identification of the second server is received through the first VPN connection.

10. The method of claim 1, wherein the identification of the second server is received from a service server that is part of a cloud-based proxy service and the service server is different from the first VPN server.

11. A client device comprising:
    one or more processors; and
    a non-transitory computer readable storage medium that stores code, which when executed by the one or more processors causes the client device to perform the following operations:
       establishing a first VPN connection between with a first server based on first VPN credentials, wherein the client device is associated with a source VPN address and the first server is associated with a destination VPN address;
       forwarding one or more flows of traffic through the first VPN connection to the first server;
       receiving an identification of a second server to be used as a destination of a second VPN connection, wherein the second VPN connection satisfies a set of traffic optimization criteria for at least one flow from the flows forwarded through the first VPN connection;
       based on the identification of the second server, establishing with the second server a second VPN connection based on second VPN credentials for the at least one flow from the flows; and
       forwarding the at least one flow through the second VPN connection to the second server.

12. The client device of claim 11, wherein the operations further comprise:
    updating a VPN routing table to define the second VPN connection from the client device to the second server for forwarding the at least one flow from the flows, wherein the second VPN connection is to be performed based on second VPN credentials and the second server is associated with a second VPN address.

13. The client device of claim 12, wherein transmitting the one or more flows of traffic through the first VPN connection is performed based on one or more entries in the VPN routing table, wherein each entry from the one or more entries is respectively associated with the one or more flows and each entry identifies for the one or more flows a respective VPN destination address and the respective VPN address is associated with an Internet Protocol (IP) address of the first server as an encapsulation IP address.

14. The client device of claim 13, wherein updating the VPN routing table to define the second VPN connection from the client device to the second server includes:
updating each entry in the VPN routing table associated with one of the at least one flow with a second VPN address of the second server, wherein the second VPN address is associated with an IP address of the second server as an encapsulation IP address.

15. The client device of claim 11, wherein the first server is a first proxy server and the second server is a second proxy server and the first and second proxy server are part of a cloud-based proxy service.

16. The client device of claim 15, wherein forwarding the one or more flows of traffic through the first VPN connection includes:
transmitting a first request for a network resource at a domain served by a first origin server that is coupled with the first proxy server; and
receiving, from the origin server and through the first proxy server and the first VPN connection, a response including the network resource.

17. The client device of claim 16, wherein forwarding the at least one flow through the second VPN connection to the second server includes:
transmitting, a second request for the network resource at the domain; and
receiving, from the origin server and through the first proxy server and the second proxy server, a second response including the network resource.

18. The client device of claim 11, wherein the traffic optimization criteria include at least one of obtaining low latency for requests for the at least one flow, obtaining high reliability of traffic forwarded through the second VPN connection, ensuring a low cost of the second VPN connection, and ensuring a good quality of service for the second VPN connection.

19. The client device of claim 11, wherein the identification of the second server is received through the first VPN connection.

20. The client device of claim 11, wherein the identification of the second server is received from a service server that is part of a cloud-based proxy service and the service server is different from the first VPN server.

21. A non-transitory computer readable storage medium that stores instructions which when executed by one or more processors of a client device cause said processors to perform the following operations for optimization of an advertisement element in a network resource, the operations comprising:
establishing a first VPN connection between with a first server based on first VPN credentials, wherein the client device is associated with a source VPN address and the first server is associated with a destination VPN address;
forwarding one or more flows of traffic through the first VPN connection to the first server;
receiving an identification of a second server to be used as a destination of a second VPN connection, wherein the second VPN connection satisfies a set of traffic optimization criteria for at least one flow from the flows forwarded through the first VPN connection;
based on the identification of the second server, establishing with the second server a second VPN connection based on second VPN credentials for the at least one flow from the flows; and
forwarding the at least one flow through the second VPN connection to the second server.

22. The non-transitory computer readable storage medium of claim 21, wherein the operations further comprise:
updating a VPN routing table to define the second VPN connection from the client device to the second server for forwarding the at least one flow from the flows, wherein the second VPN connection is to be performed based on second VPN credentials and the second server is associated with a second VPN address.

23. The non-transitory computer readable storage medium of claim 22, wherein transmitting the one or more flows of traffic through the first VPN connection is performed based on one or more entries in the VPN routing table, wherein each entry from the one or more entries is respectively associated with the one or more flows and each entry identifies for the one or more flows a respective VPN destination address and the respective VPN address is associated with an Internet Protocol (IP) address of the first server as an encapsulation IP address.

24. The non-transitory computer readable storage medium of claim 23, wherein updating the VPN routing table to define the second VPN connection from the client device to the second server includes:
updating each entry in the VPN routing table associated with one of the at least one flow with a second VPN address of the second server, wherein the second VPN address is associated with an IP address of the second server as an encapsulation IP address.

25. The non-transitory computer readable storage medium of claim 21, wherein the first server is a first proxy server and the second server is a second proxy server and the first and second proxy server are part of a cloud-based proxy service.

26. The non-transitory computer readable storage medium of claim 25, wherein forwarding the one or more flows of traffic through the first VPN connection includes:
transmitting a first request for a network resource at a domain served by a first origin server that is coupled with the first proxy server; and
receiving, from the origin server and through the first proxy server and the first VPN connection, a response including the network resource.

27. The non-transitory computer readable storage medium of claim 26, wherein forwarding the at least one flow through the second VPN connection to the second server includes:
transmitting, a second request for the network resource at the domain; and
receiving, from the origin server and through the first proxy server and the second proxy server, a second response including the network resource.

28. The non-transitory computer readable storage medium of claim 21, wherein the traffic optimization criteria include at least one of obtaining low latency for requests for the at least one flow, obtaining high reliability of traffic forwarded through the second VPN connection, ensuring a low cost of the second VPN connection, and ensuring a good quality of service for the second VPN connection.

29. The non-transitory computer readable storage medium of claim 21, wherein the identification of the second server is received through the first VPN connection.

30. The non-transitory computer readable storage medium of claim 21, wherein the identification of the second server is received from a service server that is part of a cloud-based proxy service and the service server is different from the first VPN server.

\* \* \* \* \*